(12) United States Patent
Dai et al.

(10) Patent No.: US 6,808,746 B1
(45) Date of Patent: Oct. 26, 2004

(54) MULTILAYER CARBON NANOTUBE FILMS AND METHOD OF MAKING THE SAME

(75) Inventors: Liming Dai, Wheelers Hill (AU); Shaoming Huang, Clayton (AU)

(73) Assignee: Commonwealth Scientific and Industrial Research Organisation Campell, Australian Capital Territory (AU)

( * ) Notice: Subject to any disclaimer, the term of this patent is extended or adjusted under 35 U.S.C. 154(b) by 0 days.

(21) Appl. No.: 09/958,906

(22) PCT Filed: Apr. 14, 2000

(86) PCT No.: PCT/AU00/00324

§ 371 (c)(1),
(2), (4) Date: Jan. 11, 2002

(87) PCT Pub. No.: WO00/63115

PCT Pub. Date: Oct. 26, 2000

(30) Foreign Application Priority Data

Apr. 16, 1999 (AU) .............................. PP 9764

(51) Int. Cl.[7] .................. D01F 9/127; C01B 31/02; C23C 16/01; C23C 16/26
(52) U.S. Cl. .............. 427/249.1; 427/249.4; 427/255.15; 427/255.7; 427/402; 427/903; 423/447.3; 423/445 B; 216/95; 216/97; 216/109
(58) Field of Search .................. 423/447.2, 455 R, 423/445 B, 447.1, 447.3; 216/83, 95, 97, 108, 109; 428/426, 432; 427/249.1, 249.4, 249.6, 255.11, 255.15, 255.23, 255.7, 289, 402, 903

(56) References Cited

U.S. PATENT DOCUMENTS 5,726,524 A  3/1998  Debe
5,863,601 A * 1/1999 Kikuchi et al. ............. 427/200
5,872,422 A   2/1999 Xu et al.
5,973,444 A  10/1999 Xu et al.
6,062,931 A   5/2000 Chuang et al.
6,129,901 A * 10/2000 Moskovits et al. ....... 423/447.3
6,221,330 B1 * 4/2001 Moy et al. ............... 423/447.3
6,232,706 B1 * 5/2001 Dai et al. .................... 313/309
6,283,812 B1 * 9/2001 Jin et al. ...................... 445/24

FOREIGN PATENT DOCUMENTS

| EP | 0 947 466 A   | 10/1999 |
| WO | WO 98/39250 A1 * | 9/1998 |
| WO | WO 98/42620 A1 | 10/1998 |
| WO | WO 99/65821 A  | 12/1999 |

OTHER PUBLICATIONS

Che et al., "Carbon nanotubule membranes for electrochemical energy storage and production", Nature, vol. 393, May 1998, 346–349.*

(List continued on next page.)

Primary Examiner—Shrive P. Beck
Assistant Examiner—Wesley D. Markham
(74) Attorney, Agent, or Firm—Sughrue Mion, PLLC

(57) ABSTRACT

This invention relates to a process for the preparation of a substrate-free aligned nanotube film, comprising: (a) synthesizing a layer of aligned carbon nanotubes on a quartz glass substrate by pyrolysis of a carbon-containing material, in the presence of a suitable catalyst for nanotube formation; and (b) etching the quartz glass substrate at the nanotube/substrate interface to release the layer of aligned nanotubes from the substrate. The invention also provides a process for the preparation of a multilayer carbon nanotube film comprising depositing a substrate-free carbon nanotube film onto another nanotube film. Further, the invention provides a process for the preparation of a "hetero-structured" multilayer carbon nanotube film which includes one or more carbon nanotube layers together with layers of other materials, such as metal, semiconductor and polymer.

20 Claims, 4 Drawing Sheets

OTHER PUBLICATIONS

Li et al., "Large–Scale Synthesis of Aligned Carbon Nanotubes", Science, vol. 274, Dec. 1996, 1701–1703.*

Terrones et al., "Preparation of aligned carbon nanotubes catalysed by laser–etched cobalt thin films", Chem. Phys. Lett., vol. 285, 1998, 299–305.*

Terrones et al., "Controlled production of aligned–nanotube bundles", Nature, vol. 388, Jul. 1997, 52–55.*

Kyotani et al., "Preparation of Ultrafine Carbon Tubes in Nanochannels of an Anodic Aluminum Oxide Films", Chem. Mater., vol. 8, 1996, 2109–2113.*

Che G et al.: "Chemical Vapor Deposition Based Synthesis of Carbon Nanotubes and Nanofibers Using a Template Method" Chemistry of Materials, American Chemical Society, Washington, US, vol. 10, No. 1, 1998, pp. 260–267, XP000776644 ISSN: 0028–0836.

Supplementary European Search Report dated Apr. 15, 2004.

U.S. patent application Ser. No. 09/979,792, Mau, Albert et al., filed Nov. 27, 2001.

U.S. patent application Ser. No. 10/088,737, Mau, Albert et al., filed Mar. 22, 2002.

U.S. patent application Ser. No. 09/979,793, Mau, Albert et al., Nov. 27, 2001.

Cheng H M et al: "Large Scale and Low–Cost Synthesis of Single–Walled Carbon Nanotubes by the Catalytic Pyrolysis of hydrocarbons", Applied Physics Letters, vol. 72, No. 25, Jun. 22, 1998, (1998–16–22) pp. 3282–3284, XP000771129.

Müller T., et al., "Synthesis of Nanotubes Via Catalytic Pyrolysis of Acetylene: A Sem Study", Carbon, vol. 35, No. 7, 1997, pp. 951–966, XP004083044.

Chen, X. H., et al.: "The Formation Conditions of Carbon Nanotubes Array based on FeNi Alloy Island Films", Thin Solid Films, vol. 339, Feb. 8, 1999, pp. 6–9, XP002254581.

Ren, Z. F. et al. *Synthesis of Large Arrays of Well–Aligned Carbon Nanotubes on Glass*, Science, vol. 282, (1998).

Li, W. Z. et al. *Large–Scale Synthesis of Aligned Carbon Nanotubes*, Science, vol. 274, (1996).

Huang, Dai and Mau. *Patterned Growth and Contact Trasnfer of Well–Aligned Carbon Nanotube Films*, (J. Phys. Chem. B 1999, 103, 4223–4227).

\* cited by examiner

MULTILAYER CARBON NANOTUBE FILMS AND METHOD OF MAKING THE SAME

BACKGROUND OF THE INVENTION

This invention relates to multilayer carbon nanotube materials with controllable layer thicknesss, diameter and packing density of the constituent nanotubes in each of the layers, and processes for their preparation. The invention also relates to hetero-structured multilayer carbon nanotube materials including one or more layers of carbon nanotubes and to processes for their preparation. The invention also relates to the construction of devices from such materials for practical applications in many areas including as electron field emitters, artificial actuators, chemical sensors, gas storages, molecular-filtration membranes, energy-absorbing materials, molecular transistors and other optoelectronic devices.

Carbon nanotubes usually have a diameter in the order of tens of angstroms and the length of up to several micrometers. These elongated nanotubes consist of carbon hexagons arranged in a concentric manner with both ends of the tubes normally capped by pentagon-containing, fullerene-like structures. They can behave as a semiconductor or metal depending on their diameter and helicity of the arrangement of graphitic rings in the walls, and dissimilar carbon nanotubes may be joined together allowing the formation of molecular wires with interesting electrical, magnetic, non-linear optical, thermal and mechanical properties. These unusual properties have led to diverse potential applications for carbon nanotubes in material science and nanotechnology. Indeed, carbon nanotubes have been proposed as new materials for electron field emitters in panel displays, single-molecular transistors, scanning probe microscope tips, gas and electrochemical energy storages, catalyst and proteins/DNA supports, molecular-filtration membranes, and energy-absorbing materials (see, for example: M. Dresselhaus, et al., *Phys. World*, January, 33, 1998; P. M. Ajayan, and T. W. Ebbesen, *Rep. Prog. Phys.*, 60, 1027, 1997; R. Dagani, *C&E News*, Jan. 11, 31, 1999).

For most of the above applications, it is highly desirable to prepare aligned carbon nanotubes so that the properties of individual nanotubes can be easily assessed and they can be incorporated effectively into devices. Carbon nanotubes synthesised by most of the common techniques, such as arc discharge and catalytic pyrolysis, often exist in a randomly entangled state (see, for example: T. W. Ebbesen and P. M. Ajayan, *Nature* 358, 220, 1992; M. Endo et al., *J. Phys. Chem. Solids*, 54, 1841, 1994; V. Ivanov et al., *Chem. Phys. Lett.*, 223, 329, 1994). However, aligned carbon nanotubes have recently been prepared either by post-synthesis manuipulation (see, for example: M. Endo, et al., *J. Phys. Chem. Solids*, 54, 1841, 1994; V. Ivanov, et al., *Chem. Phys. Lett.*, 223, 329, 1994; H. Takikawa et al., *Jpn. J. Appl. Phys.*, 37, L187, 1998) or by synthesis-induced alignment (see, for example: W. Z. Li, *Science*, 274, 1701, 1996; Che, G., *Nature*, 393, 346, 1998; Z. G. Ren, et al., *Science*, 282, 1105, 1998; C. N., Rao, et al., *J.C.S., Chem. Commun.*, 1525, 1998).

SUMMARY OF THE INVENTION

Multilayer structures built up from aligned carbon nanotubes are of vital interest, as the use of multilayered semiconductor materials and devices has been demonstrated to be highly desirable for many applications. Examples include the use of molecular-beam epitaxy for making superlattices consisting of the alternating layers of gallium arsenide and aluminium arsenide as hetero-structured semiconductor materials (M. A. Herman and H. Sitter, "*Beam Epitaxy: Fundamentals and Current Status*", Springer-Verlag, Berlin, 1989), the use of Langmuir-Blodgett and chemical vapor deposition techniques for construction of organic field-emission transistors (M. F. Rubner and T. A. Skotheim, in "*Conjugated Polymers*", J. L. Brédas and R. Silbey (eds.), Kluwer Academic Publishers, Dordrecht, 1991; G. Horowitz, *Adv. Mater.*, 10, 365, 1998), and the use of layer-by-layer adsorption and solution-spinning methods for preparing multilayer thin films of conjugated polymers as organic light-emitting diodes (S. A. Jenekhe and K. J. Wynne, "*Photonic and Optoelectronic Polymers*", ACS Sym. Ser. 672, ACS Washington, D.C., 1995; L. Dai, *J. Macromole. Sci., Rev. Macromole. Chem. Phys.* 1999, 39(2), 273–387). The overall properties of multilayer materials and/or devices are highly dependent on not only the intrinsic properties characteristic of the constituent materials in each of the layers but also the particular layer stacking sequence, the interface and surface structures, thus adding additional parameters for the design and control of their behaviours. It has now been found that multilayer structures of the perpendicularly-aligned carbon nanotubes over large areas can be prepared either by sequential syntheses or by transferring substrate-free nanotube films.

According to a first aspect, the present invention provides a process for the preparation of a substrate-free aligned nanotube film comprising:

(a) synthesising a layer of aligned carbon nanotubes on a quartz glass substrate by pyrolysis of a carbon-containing material in the presence of a suitable catalyst for nanotube formation; and (b) etching the quartz glass substrate at the nanotube/substrate interface to release said layer of aligned nanotubes from the substrate.

Separating the layer of aligned nanotubes by etching the quartz glass substrate allows the resulting nanotube film to be deposited on another substrate, such as an electrode, and/or to be included as a layer in a multilayer materials, with the integrity of the aligned nanotubes being largely maintained in the transferred films.

The carbon-containing material may be any compound or substance which includes carbon and which is capable for forming carbon nanotubes when subjected to pyrolysis in the presence of a suitable catalyst. Examples of suitable carbon-containing materials include alkanes, alkenes, alkynes or aromatic hydrocarbons and their derivatives, for example methane, acetylene, benzene, transition meal phthalocyanines, such as Fe(II) phthalocyanine, and other organometallic compounds such as ferrocene and nickel dicyclopentadiene.

The catalyst may be any compound, element or substance suitable for catalysing the conversion of a carbon-containing material to aligned carbon nanotubes under pyrolytic conditions. The catalyst may be a transition metal, such as Fe, Co, Al, Ni, Mn, Pd, Cr or alloys thereof in any suitable oxidation state.

The catalyst may be incorporated into the substrate or may be included in the carbon-containing material. Examples of carbon-containing materials which include a transition metal catalyst are Fe(II) phthalocyanine, Ni(II) phthalocyanine, nickel dicyclopentadiene and ferrocene. When the catalyst and carbon-containing material are included in the same material it may be necessary to provide sources of additional catalyst or additional carbon-containing material. For example, when ferrocene is used as the catalyst and a source of carbon, it is necessary to provide an additional carbon source, such as ethylene, to obtain the required nanotube growth.

The pyrolysis condition employed will depend on the type of carbon-containing material employed and the type of catalyst, as well as the length and density of the nanotubes required. In this regard it is possible to vary the pyrolysis conditions, such as the temperature, time, pressure or flow rate through the pyrolysis reactor, to obtain nanotubes having different characteristics.

For example, performing the pyrolysis at a higher temperature may produce nanotubes having different base-end structures relative to those prepared at a lower temperature. The pyrolysis will generally be performed within a temperature range of 800° C. to 1100° C. Similarly lowering the flow rate through a flow-type pyrolysis reactor may result in a smaller packing density of the nanotubes and vice versa. A person skilled in the art would be able to select and control the conditions of pyrolysis to obtain nanotubes having the desired characteristics.

The quartz glass substrate may be etched by subjecting the coated quartz glass substrate to any conditions capable of releasing the carbon nanotube film from the substrate or of dissolving the quartz glass substrate. For example the coated substrate may be immersed or otherwise contacted with an aqueous solution of hydrofluoric acid.

In another aspect of the present invention there is provided a process for the preparation of a multilayer carbon nanotube film comprising:

(a) synthesising a layer of aligned carbon nanotubes on a suitable substrate by pyrolysis of a carbon-containing material in the presence of a suitable catalyst for nanotube formation to provide a nanotube coated substrate;

(b) synthesising a further layer of aligned carbon nanotubes on said nanotube coated substrate by pyrolysis of a carbon-containing material in the presence of a suitable catalyst for nanotube formation.

According to this aspect the substrate may be any substrate capable of withstanding the pyrolysis conditions employed, and capable of supporting aligned carbon nanotube growth. Examples of suitable substrates include quartz glass, mesoporous silica, nanoporous alumina, ceramic plates, glass, graphite and mica. Preferably the substrate is quartz glass.

The second step of this aspect of the invention may be repeated to provide three or more layers of carbon nanotubes.

The pyrolysis conditions employed for step (b) may be the same or different to the conditions employed for step (a). Similarly the pyrolysis conditions associated with the synthesis of any additional layers may be the same or different to the conditions employed in steps (a) and (b). Change of pyrolysis conditions may provide layers of differing structures which would lead to different characteristics e.g. conductivity, for each of the nanotube layers, enabling the manufacture of diode-like electronic devices or of asymmetric layered composite materials with different materials on each surface.

It is also possible to prepare a substrate-free multilayer film of aligned carbon nanotubes by selecting quartz glass as the substrate and releasing the film from the substrate in accordance with the methodology described above.

In a further aspect of the present invention there is provided a process for the preparation of a multilayer carbon nanotube film comprising depositing a substrate-free carbon nanotube film onto another carbon nanotube film.

This aspect represents an alternative process for forming multilayer carbon nanotube films. According to this aspect of the invention a carbon-nanotube film, which may be mono or multilayered, is released from the quartz glass substrate on which it is formed and deposited as additional layer(s) on another carbon nanotube film, which itself may be mono or multilayered and which may be attached to a substrate or substrate-free. This process may be repeated in order to increase the number of layers.

In yet another aspect of the present invention there is provided a process for the preparation of a substrate-free hetero-structured multilayer carbon nanotube film comprising:

(a) synthesising a layer of aligned carbon nanotubes on a metal, metal oxide or semiconductor-coated quartz glass substrate by pyrolysis of a carbon-containing material in the presence of a suitable catalyst for nanotube formation; and (b) etching said substrate at the quartz/metal surface to release said hetero-structured multilayer film from the quartz glass.

The term "hetero-structured" as used herein refers to a multilayer structure which includes one or more carbon nanotube layers together with layers of other materials, such as metal, semiconductor, polymer etc.

The metal used to coat the quartz glass substrate may be any suitable metal which is capable of supporting carbon nanotube growth under the pyrolysis conditions employed. Examples of suitable metals include Au, Pt, Cu, Cr, Ni, Fe, Co and Pd. Examples of suitable metal oxides include indium tin oxide (ITO), $Al_2O_3$, $TiO_2$ and MgO. Examples of semiconductor materials include gallium arsenide, aluminium arsenide, aluminium sulphide and gallium sulphide.

Prior to etching the hetero-structured film from the quartz glass substrate it is possible to add one or more further layers to the film. These additional layers may be carbon nanotube layers added by further pyrolysis of a carbon-containing material in the presence of a suitable catalyst, or may be added by deposition of a substrate-free mono or multilayer aligned carbon-nanotube film. The additional layers may also include layers of other materials, such as metal, metal oxide, semiconductor material or polymers, deposited onto the carbon nanotube layer by any suitable method. Examples of suitable polymers include conjugated (conducting) polymers, temperature/pressure responsive polymers, bioactive polymers and engineering resins.

In another aspect the invention provides a process for the preparation of hetero-structured multilayer carbon nanotube film comprising intercalating a substrate free aligned carbon nanotube film into a multilayer structure.

In this regard the multilayer structure may include layers of metal, metal oxide, semiconductor materials or polymers.

In yet another aspect of the present invention there is provided a process for the preparation of a hetero-structured multilayer carbon nanotube film comprising:

(a) synthesising a layer of aligned carbon nanotubes on a quartz glass substrate by pyrolysis of a carbon-containing material in the presence of a suitable catalyst for nanotube formation to provide a nanotube coated substrate;

(b) coating a layer of a pyrolysis resistant material onto said nanotube coated substrate to provide a hetero-structured multilayered substrate;

(c) synthesising a further layer of aligned carbon nanotubes on said hetero-structured multilayered substrate by pyrolysis of a carbon-containing material in the presence of a suitable catalyst for nanotube formation.

As with the previously described aspects of the invention additional layers of carbon nanotubes or other materials may be included, and the film may be etched from the quartz glass substrate to provide a substrate-free film.

The multilayered film prepared in accordance with any one of the processes of the present invention and devices, materials coated with or including these multilayer films represent further aspects of the present invention.

As is evident from the above description the invention allows the preparation of a large variety of multilayer films and structures. It is also possible to provide patterned layers using appropriate masking and etching techniques. The processes of the present invention and the film structures formed may have use in the following applications:

1) electron emitters
2) field-emission transistors
3) electrodes for photovoltaic cells and light emitting diodes
4) optoelectronic elements
5) bismuth actuators
7) chemical and biological sensors
8) gas storages
9) molecular-filtration membranes
10) energy absorbing material

BRIEF DESCRIPTION OF THE DRAWINGS

The invention can be more fully understood from the following detailed description of several examples, in which reference is made to the accompanying drawings. It should be understood that the examples described are only for an illustration purpose, which does not intend to constitute a limitation of the invention.

Referring to the drawings.

DETAILED DESCRIPTION OF THE INVENTION

EXAMPLE 1

Preparation of Aligned Carbon Nanotubes

Figure 1:
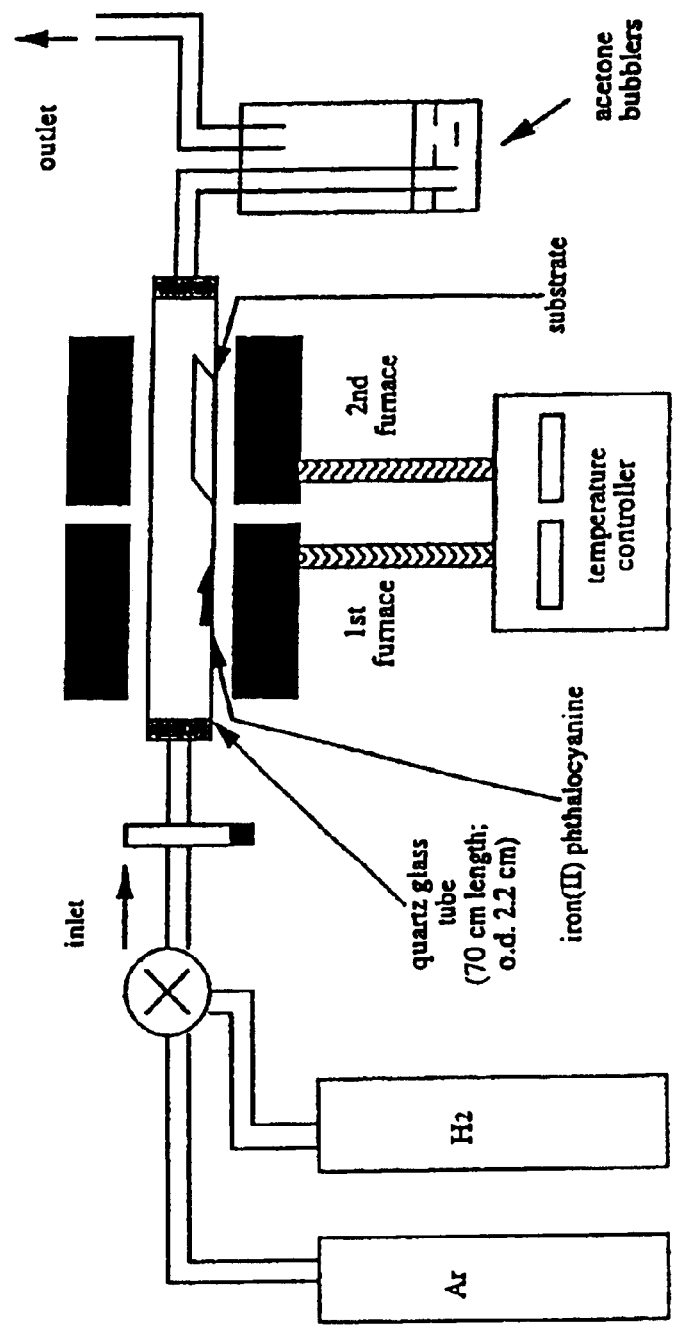
FIG. 1 is a diagrammatic representation of a pyrolysis flow reactor suitable for preparing aligned carbon nanotubes according to the invention.
Figure 2A:
FIG. 2a is a scanning electron microscopic image of aligned carbon nanotubes prepared in accordance with the present invention.
Figure 2B:
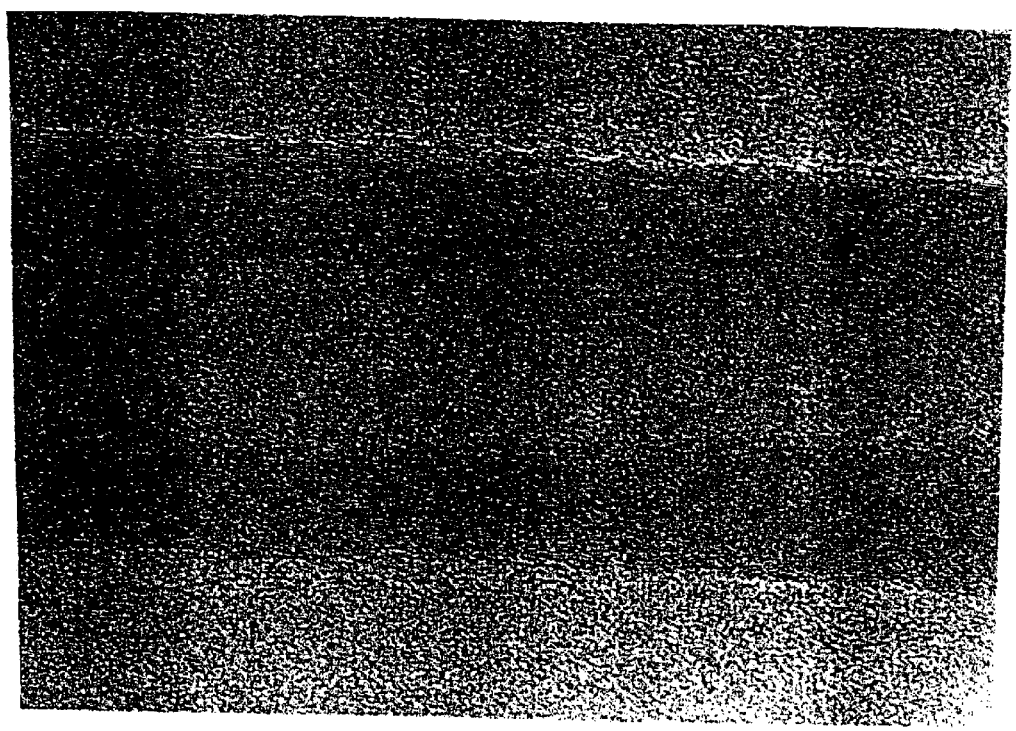
FIG. 2b is a high resolution transmission electron microscopic image of an individual carbon nanotube.

Aligned carbon nanotubes were prepared by pyrolysis of iron (II) phthalocyanine under $Ar/H_2$ at 800–1100° C. using an appropriate substrate in a flow reactor consisting of a quartz glass tube and a dual furnace fitted with independent temperature controllers (FIG. 1). FIG. 2a represents a typical scanning electron microscopic (SEM, XL-30 FEG SEM, Philips, at 5 KV) image of the carbon nanotubes, showing that the as-synthesised nanotubes align almost normal to the substrate surface. The aligned nanotubes are densely packed with a fairly uniform tubular length of ca. 25 $\mu$m. However, the length of the aligned nanotubes can be varied over a wide range (from a few to several tens of micrometers) in a controllable fashion by changing the experimental conditions (e.g. the pyrolysis time, flow rate). A well-graphitised structure with ca. 40 concentric carbon shells and an outer diameter of ca. 40 nm is illustrated in the high resolution transmission electron microscopic (HR-TEM, CM30, Philips, at 300 KV) image of an individual nanotube (FIG. 2b).

EXAMPLE 2

Preparation of Substrate-free Films of the Aligned Carbon Nanotubes

The carbon nanotubes prepared in Example 1 appear on the substrate (e.g. a quartz glass plate) as a black layer, which could be scraped off from the substrate as powder. More importantly, the black deposit was easily separated from the quartz glass as a substrate-free, floating film simply by immersing the nanotube-deposited quartz plate into an aqueous hydrofluoric acid solution (10–40% w/w). This technique allows a transfer of the nanotube films onto various other substrates of particular interest (e.g. electrodes for electrochemistry) with the integrity of the aligned nanotubes largely maintained in the transferred films.

EXAMPLE 3

Figure 3:
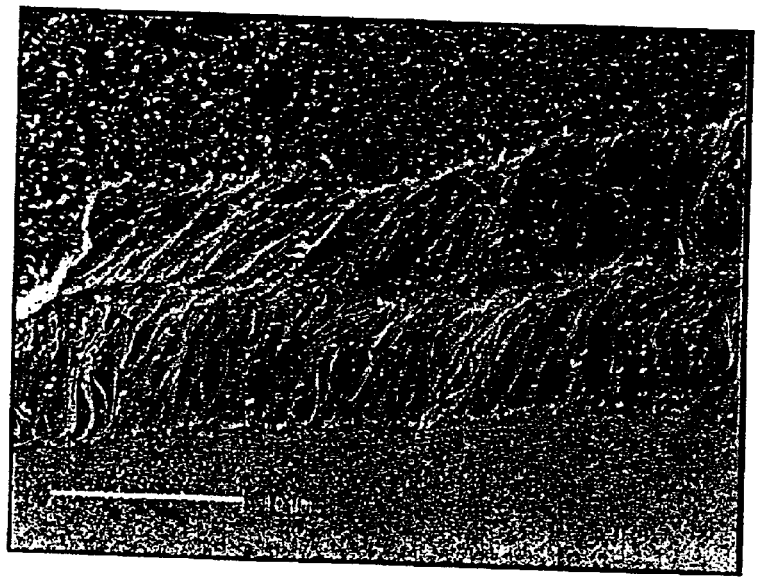
FIG. 3 is a scanning electron microscopic image of a double layer carbon nanotube structure prepared by deposition of a substrate-free carbon nanotube film.

Preparation of Multilayer Nanotube Films by Repetitively Transferring the Freely-suspended Films The substrate-free films of the aligned nanotubes can be readily transferred onto various substrates including those which otherwise may be not be suitable for nanotube growth at high temperatures (e.g. polymer films) by the Langmuir-Blodgett technique. By repetitively depositing the substrate-free nanotube films on each other, multilayer films of the aligned carbon nanotubes (as shown in FIG. 3 for a double layer structure) can be obtained. It is noted that hetero-structured multilayer films with foreign components intercalated between any two consecutive layers can be made by alternatively depositing the substrate-free nanotube film and the foreign material.

EXAMPLE 4

Figure 4A:
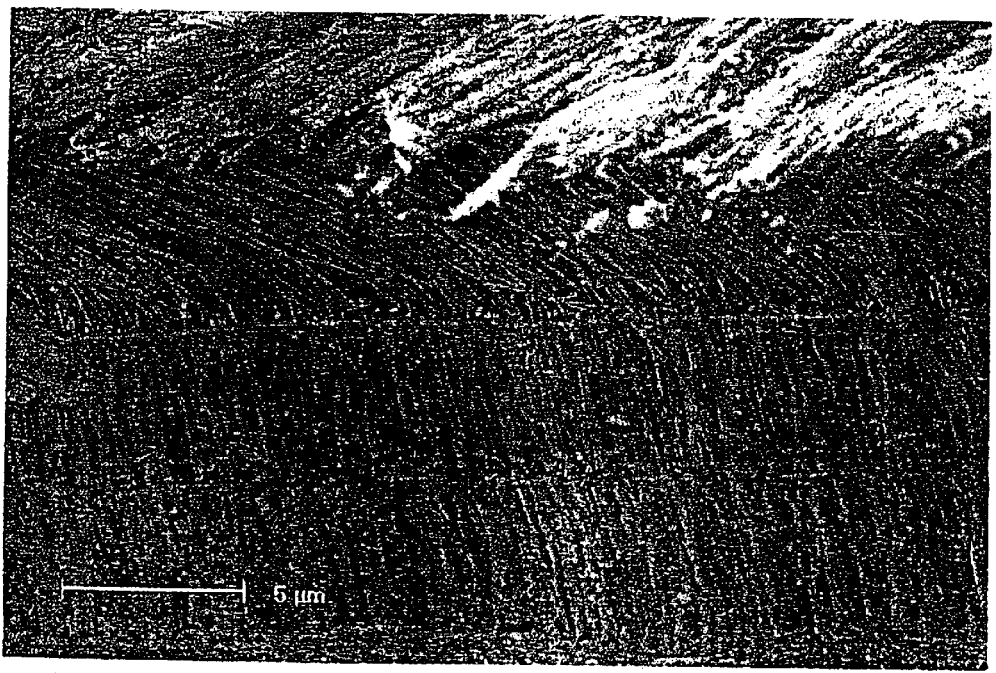
FIG. 4a is a scanning electron microscopic image of a double layer carbon nanotube structure prepared using a first nanotube layer as a substrate for growth of a second layer.
Figure 4B:
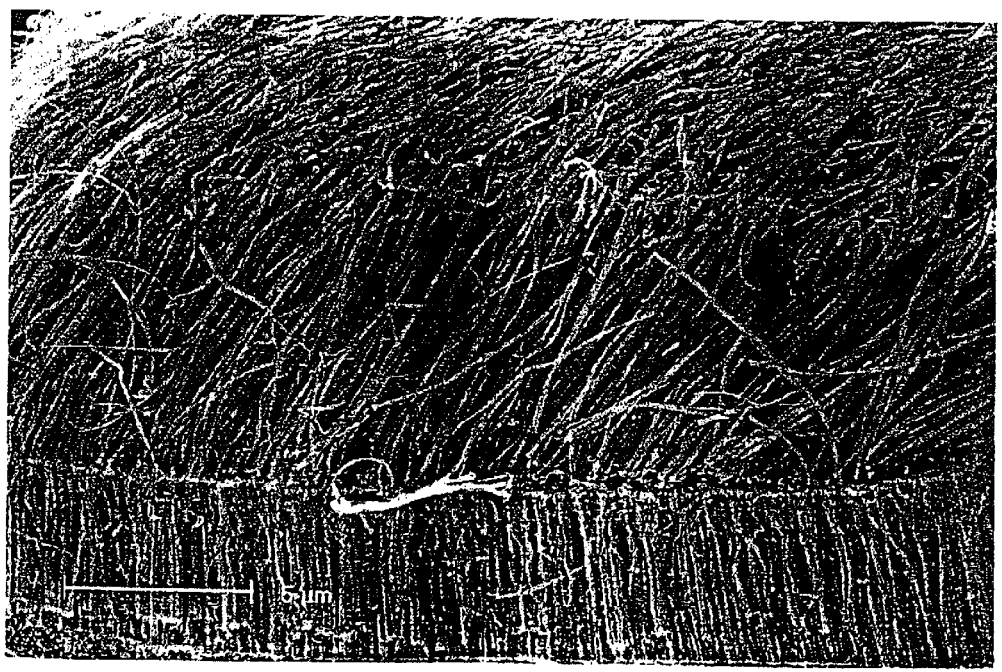
FIG. 4b is similar to FIG. 4a, except a reduced flow rate was employed during synthesis of the second layer.

Multilayer Nanotube Films were Prepared by an In-situ Growth Process During the Pyrolysis FIG. 4a shows a typical scanning electron microscopic image of a double layer carbon nanotube film prepared by using the first nanotube layer as the substrate for the growth of the second layer nanotubes in a separate experiment. FIG. 4b shows a corresponding SEM image of a double layer nanotube film produced by reducing the monomer flow rate upon the formation of the first nanotube layer, showing a smaller packing density for the second nanotube layer. As can be seen, therefore, the length and packing density of the aligned nanotubes in each of the layers can be varied by choosing different synthetic routes and/or changing the experimental conditions (e.g. the pyrolysis time, flow rate). Furthermore, the synthetic process associated with FIG. 4a should allow hetero-structured multilayer nanotube films to be made by introducing foreign materials (e.g. Au, Pt, Cu and ITO) between any of the two consecutive layers.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

Those skilled in the art will appreciate that the invention described herein is susceptible to variations and modifications other than those specifically described. It is to be understood that the invention includes all such variations and modifications. The invention also includes all of the steps, features, compositions and compounds referred to or indicated in this specification, individually or collectively, and any and all combinations of any two or more of said steps or features.

What is claimed is:

1. A process for the preparation of a substrate-free aligned nanotube film comprising:
   (a) synthesizing a layer of aligned carbon nanotubes on a quartz glass substrate by pyrolysis of a carbon-containing material in the presence of a suitable catalyst for nanotube formation; and
   (b) etching the quartz glass substrate at the nanotube/substrate interface to release said layer of aligned nanotubes from the substrate.

2. A process according to claim 1, wherein the carbon-containing material is selected from the group consisting of alkanes, alkenes, alkynes, aromatic hydrocarbons and their transition metal derivatives.

3. A process according to claim 1 wherein the catalyst includes a transition metal.

4. A process according to claim 3 wherein the catalyst is selected from the group consisting of Fe, Co, Al, Ni, Mn, Pd, Cr and alloys thereof in any suitable oxidation state.

5. A process according to claim 1 wherein the catalyst is incorporated into the substrate.

6. A process according to claim 1 wherein at least a portion of the catalyst is included in the carbon-containing material.

7. A process according to claim 6 wherein the carbon containing material which includes a catalyst is selected from the group consisting of Fe(II) phthalocyanine, Ni(II) phthalocyanine, ferrocene and nickel dicyclopentadiene.

8. A process according to claim 6 wherein sources of additional catalyst or additional carbon-containing material are provided in the pyrolysis step.

9. A process according to claim 1 wherein pyrolysis is performed within a temperature range of 800° C. to 1100° C.

10. A process according to claim 1 wherein step (a) is conducted in a flow-type pyrolysis reactor.

11. A process according to claim 10 wherein the aligned carbon nanotubes synthesized in the substrate have a packing density which is controlled by adjusting the flow rate of carbon-containing material through the reactor.

12. A process according to claim 1 wherein the layer of aligned carbon nanotubes is etched from the substrate by immersing or otherwise contacting the coated substrate with an aqueous solution of hydrofluoric acid.

13. A process for the preparation of a multilayer carbon nanotube film comprising:
   (a) synthesizing a layer of aligned carbon nanotubes on a suitable substrate by pyrolysis of a carbon-containing material in the presence of a suitable catalyst for nanotube formation to provide a nanotube coated substrate; and
   (b) synthesizing a further layer of aligned carbon nanotubes on said nanotube coated substrate by pyrolysis of a carbon-containing material in the presence of a suitable catalyst for nanotube formation,
   wherein the further layer is synthesized employing conditions which are different to those employed in step (a).

14. A process according to claim 13 wherein the substrate is selected from the group consisting of quartz glass, mesoporous silica, nanoporous alumina, ceramic plates, glass, graphite and mica.

15. A process according to claim 14 wherein the substrate is quartz glass.

16. A process according to claim 13 wherein step (b) is repeated to provide three or more layers of carbon nanotubes.

17. A process for the preparation of a hetero-structured multilayer carbon nanotube film comprising:
   (a) synthesizing a layer of aligned carbon nanotubes on a quartz glass substrate by pyrolysis of a carbon-containing material in the presence of a suitable catalyst for nanotube formation to provide a nanotube coated substrate;
   (b) coating a layer of a pyrolysis resistant material onto said nanotube coated substrate to provide a hetero-structured multilayered substrate; and
   (c) synthesizing a further layer of aligned carbon nanotubes on said hetero-structured multilayered substrate by pyrolysis of a carbon-containing material in the presence of a suitable catalyst for nanotube formation.

18. A process for the preparation of a substrate-free hetero-structured multilayer carbon nanotube film comprising:
   (a) synthesizing a layer of aligned carbon nanotubes on a metal, metal oxide or semiconductor-coated quartz glass substrate by pyrolysis of a carbon-containing material in the presence of a suitable catalyst for nanotube formation; and
   (b) etching said substrate at a quartz/metal, metal oxide or semiconductor coating surface to release said hetero-structured multilayer film from the quartz glass.

19. A process according to claim 18 wherein the quartz glass substrate is coated with a metal selected from the group consisting of Au, Pt, Cu, Cr, Ni, Fe, Co and Pd, a metal oxide selected from the group consisting of indium tin oxide (ITO), $Al_2O_3$, $TiO_2$ and MgO or a semiconductor material selected from the group consisting of gallium arsenide, aluminium arsenide, aluminium sulphide and gallium sulphide.

20. A process for the preparation of a hetero-structured multilayer carbon nanotube film comprising:
   (a) synthesizing a layer of aligned carbon nanotubes on a quartz glass substrate by pyrolysis of a carbon-containing material in the presence of a suitable catalyst for nanotube formation;
   (b) etching the quartz glass substrate at the nanotube/substrate interface to release said layer of aligned nanotubes from the substrate; and
   (c) intercalating the released substrate-free aligned carbon nanotube film into a multilayer structure.

* * * * *